(12) United States Patent
Steinke

(10) Patent No.: US 6,431,235 B1
(45) Date of Patent: Aug. 13, 2002

(54) NON-PNEUMATIC TIRE AND RIM COMBINATION

(76) Inventor: Richard A. Steinke, 705 Yucca St., Boulder City, NV (US) 89005

( * ) Notice: Subject to any disclaimer, the term of this patent is extended or adjusted under 35 U.S.C. 154(b) by 0 days.

(21) Appl. No.: 09/569,904

(22) Filed: May 11, 2000

(51) Int. Cl.$^7$ .............................. B60C 7/00; B60C 7/24
(52) U.S. Cl. ...................... 152/310; 152/313; 152/323; 152/324; 152/325; 152/327
(58) Field of Search ................................. 152/302, 310, 152/313, 318, 319, 320, 321, 322, 323, 324, 325, 326, 327, 328, 329, 382, 209.5

(56) References Cited

U.S. PATENT DOCUMENTS

| | | | |
|---|---|---|---|
| 438,383 A | * | 10/1890 | Overman |
| 628,284 A | * | 7/1899 | Quinsker et al. |
| 1,056,976 A | | 3/1913 | Divine |
| 1,064,766 A | * | 6/1913 | Pfouts |
| 1,169,984 A | * | 2/1916 | Mettler |
| 1,178,887 A | | 4/1916 | Thoens |
| 1,194,177 A | | 8/1916 | Henderson |
| 1,312,124 A | * | 8/1919 | Killer |
| 1,491,537 A | * | 4/1924 | Killer |
| 1,670,721 A | | 5/1928 | Hitchner |
| 3,396,773 A | * | 8/1968 | Alderfer |
| 3,533,662 A | | 10/1970 | Richards et al. |
| 4,033,395 A | * | 7/1977 | Berg et al. |
| 4,127,166 A | * | 11/1978 | Wyman |
| 4,588,542 A | | 5/1986 | Pierce |
| 4,855,095 A | | 8/1989 | Panaroni |
| 4,943,223 A | | 7/1990 | Panaroni |
| 5,229,047 A | | 7/1993 | Becker |
| 5,906,836 A | * | 5/1999 | Panaroni et al. |
| 6,116,308 A | * | 9/2000 | Yoshida |

FOREIGN PATENT DOCUMENTS

| | | | |
|---|---|---|---|
| DK | 35946 | * | 4/1926 |
| EP | 57917 | * | 8/1982 |
| EP | 81728 | * | 6/1983 |
| FR | 338920 | | 7/1904 |
| FR | 367981 | | 9/1906 |
| GB | 2367-1878 | | of 1878 |
| GB | 3432-1881 | | of 1881 |
| GB | 11800 | | of 1889 |
| GB | 15439 | | of 1890 |
| GB | 14997 | | of 1897 |
| GB | 20186 | | of 1900 |
| GB | 27224 | | of 1902 |
| GB | 4564 | * | of 1906 |
| GB | 406896 | * | 3/1934 |
| GB | 2047637 | * | 12/1980 |
| JP | 59-128001 | * | 7/1984 |

* cited by examiner

Primary Examiner—Steven D. Maki
(74) Attorney, Agent, or Firm—M. Reid Russell

(57) ABSTRACT

A non-pneumatic tire and rim whereto the tire is fitted as a wheel assembly that will display ride characteristics that are similar to those of a conventional pneumatic tire. The non-pneumatic tire is preferably formed from a urethane foam in a spin casting process with the formed tire having a dense thread, with a less dense internal mid-section and is least dense at a lower area proximate to the tire inner circumference. Identical tire side wall grooves are formed in the tire side walls to receive and provide an interference fit with hook bead ends formed in top ends of sides of a U-shaped rim, with the rim further including upstanding ridges or piers formed along opposite edges of the rim web or wheel well that are to receive and maintain support grooves formed around the tire inner circumference sides supporting the tire inner circumference mid-section between the rim ridges or piers to allow the tire material to flex into an open area above the rim wheel well and below the tire inner circumference, which non-pneumatic tire flexure or flow into that open area occur in response to a compressive force being directed into the tire tread as the wheel rolls over a rock, into a hole, or the like, providing a tire ride that is like that of a pneumatic tire.

4 Claims, 3 Drawing Sheets

NON-PNEUMATIC TIRE AND RIM COMBINATION

BACKGROUND OF THE INVENTION

1. Field of The Invention

This invention pertains to non-pneumatic tires for mounting onto a rim, forming a wheel structure, and more particularly to a light weight, integrally molded tire/rim structure having the mechanical and riding performance characteristics of a conventional pneumatic wheel structure.

2. Prior Art

The present invention contemplates a new and improved tire and rim assembly which is simple in design, effective in use, provides a combination that has ride and wear characteristics that approximate, or are better than, a conventional pneumatic tire and wheel assembly, is lighter in weight than such pneumatic tire and wheel assembly, and can be manufactured at a significantly lesser cost.

Essentially solid, cavity free, non-pneumatic tires have been used for many years going back to as early as 1878 as set out in a British Patent No. 2,367 that shows a solid resilient tire and rim. A number of later patents also show non-pneumatic tire and rim combinations as, for example, British Pat. Nos. 3,432; 15,439; 20,186; and 27,224, French Pat. Nos. 338,920 and 367,981 and U.S. Pat. Nos. 1,056,976; 1,178,887; 3,533,662 and 5,229,047. Further, non-pneumatic tires are shown manufactured in earlier U.S. Pat. Nos. 4,855,096 and 4,943,323, that were co-invented by the present inventor. Which non-pneumatic tires have all been arranged for mounting onto a rim. Additionally, other earlier patents covering non-pneumatic tires, that include inner cavities, are shown in early British Patent Nos. 11,800 and 14,997 along with early U.S. Pat. Nos. 1,194,177 and 1,670,721. None of which solid non-pneumatic, or solid non-pneumatic tires that include cavities, have included a rim mounting where the tire is maintained to the rim so as to allow for tire inward or radial flexure into a void or open area between the tire inner circumference and rim wheel well to more nearly duplicate the ride action of a pneumatic tire.

In practice, non-pneumatic tires have the advantage of not going flat or experiencing a blow-out. Heretofore, however, this advantage has not outweighed the better cushioning and shock absorbing characteristics presented by a pneumatic tire. The tire and rim combination of the invention provide a wheel that will not go flat and still provides a cushioned shock absorbing wheel duplicating the ride qualities of a pneumatic tire.

Weight is an important criteria in a tire and wheel assembly. A disadvantage of the conventional pneumatic and/or prior art non-pneumatic tire and wheel assemblies is their excessive weight. This results from the two- and three-piece assembly of the tire and rim combination as well as the tire material used in prior art tire designs. Such excessive weight increases the overall weight of the vehicle, such as a bicycle, and hence, more energy is expended to propel the vehicle.

Heretofore, tires have generally utilized beads to hold the tire upon the wheel, and such beads usually are formed from high-tensile steel wire formed into inextensible hoops. The bead functions to anchor the plies of the tire together and to hold the tire on the wheel rim. The shape or flange of the bead conforms to the flange of the rim to prevent the tire from rocking, slipping or rolling off the wheel rim. While the beads have been successful in holding a tire on a rim they are an additional cost, add to the weight of the tire, and require additional manufacturing, assembly time, resulting in increased production costs. The invention provides a beadless non-pneumatic tire that is mounted to present an open area between the tire undersurface or inner circumference and the rim web or wheel well that the tire lower portion will flex into, providing ride cushioning that is like that of a pneumatic tire. The lack of a tire bead and the formation of a tire configured to fit into a rim to leave a void or open area between the rim web and tire undersurface presents a minimum tire volume thereby minimizing the amount of tire materials needed for tire manufacture, and presents a minimal weight of a tire and rim combination.

SUMMARY OF THE INVENTION

It is a principal object of the present invention in a non-pneumatic tire and its rim to provide a beadless mechanical lock mounting such that a tire lower area well flex into a cavity or open area between the tire inner circumference and the rim web or wheel well, cushioning forces as are directed into the wheel by expansion of the tire material into that cavity or open area.

Another object of the present invention is to provide pier supports formed around the rim web or wheel well ends for supporting the tire inner circumference ends so as to leave the tire circumference unsupported between its ends unsupported, providing for tire flexure under compressive load into a space or open area that is between the tire inner circumference and the rim web or wheel well surface.

Another object of the present invention is to provide a non-pneumatic tire and rim combination where the tire includes an interference mounting that is easily installed onto and is conveniently removable from the rim.

Still another object of the present invention is to provide, in addition to the tire and rim interference mounting, as required, a chemical lock that is applied to the opposing rim and tire surfaces to assist in maintaining the non-pneumatic tire on the rim.

Still another object of the present invention is to provide a non-pneumatic tire and rim combination that is light in weight and which non-pneumatic tire has superior wear and stability characteristics as compared to pneumatic tires.

In accordance with the present invention, a new and improved non-pneumatic tire that includes a beadless interference lock for maintaining it onto a rim, and also includes support ridges or piers that support the tire sides lower ends while leaving the tire inner circumference unsupported to flex freely into a cavity or open area between the rim web or wheel well and the mid-portion of the non-pneumatic tire inner circumference.

The preferred non-pneumatic tire is formed from urethane foam, preferably by a spin casting process, to include side wall grooves that are to seat within and provide an interference fit to the rim. The seating within the rim, in practice, has approximately a one (1.0) percent with flanges of a U-shaped rim, the rim flanges are perpendicular to the rim sides top ends and extend inwardly to receive the tire wall grooves, providing an interference fit and forming a mechanical lock of the tire to the rim flange that can be augmented with an adhesive, as desired.

The rim sides slope inwardly and terminate in junctions with the rim web or wheel well wherein are from continuous ridges, piers or steps that are to support the non-pneumatic tire inner circumference ends that are formed around the junctions of the tire side walls and inner circumference ends. So arranged, the tire inner circumference mid-section will be unsupported above the rim web or wheel well. The open area or space between the tire inner circumference and the wheel well surface is to receive a flow of the tire materials directed therein as the tire flexes in response to a compressive force exerted into the tire tread. The non-pneumatic tire thereby exhibits compression and rebound as it rolls over a surface, bumps over rocks and the like, providing a ride that is similar to that provided by a pneumatic tire.

Still other benefits and advantages of the invention will become apparent to those skilled in the art to which it pertains upon a reading and understanding of the following detailed specification.

DESCRIPTION OF THE DRAWINGS

The invention may take physical form in certain parts and arrangement of parts, and a preferred embodiment of which will be described in detail in this specification and illustrated in the accompanying drawings which form a part hereof.

DETAILED DESCRIPTION

The invention is herein described with reference to a bicycle wheel that, it should be understood, can be one of a variety of rim diameters, with the rim manufactured from metal, composite, or the like, within the scope of this disclosure. Accordingly, it should be understood, that the bicycle tire and its mounting to a bicycle rim as a bicycle wheel assembly is here presented as an example only and that variations and alterations thereof should be taken as being within the scope of this disclosure. Accordingly, the invention includes tires that are made of urethane foam and/or a shell urethane elastomer, so long as such non-pneumatic tires are arranged to be mounted to the rim such that the tire inner circumference is supported to the rim at the rim web edges so as to allow interior flexure of the tire material into an open area or space between the tire inner circumference and rim wheel well or web responsive to tire use, approximating the ride characteristics of a pneumatic tire.

The invention described includes an arrangement for attaching a non-pneumatic tire to a rim at the tire side walls and further provides for maintaining the tire at its inner circumference ends leaving the tire bottom or inner circumference mid-section unsupported to flex into an open area or cavity below the tire inner circumference mid-section and above the rim web or wheel well. Which attachment of rim hook bead ends into tire side wall grooves provides an interference fit that does not require a reinforcement of the tire side walls by a separate bead to provide an effective mechanical locking of the tire to the rim. So arranged, the non-pneumatic tire is joined to the rim of the invention so as to provide a wheel that will exhibit the ride characteristics of a pneumatic tire without, of course, the tire being subject to puncture and tire deflation as is the case with a pneumatic tire.

Further, as is the case with all tire and wheel assemblies, road forces as are exerted upon the non-pneumatic tire and wheel assembly tend to dislocate the tire from the rim. To handle such side loads as the tire is anticipated to be subjected to, for example for off-road operations, the tire to rim mounting of the invention may be augmented by application of an adhesive in a rim grooves formed in the tire side walls wherein the rim hook bead end is positioned. Further, as appropriate, such an adhesive layer can be applied to the rim ridges or piers that support the tire inner circumference edges, to further insure the maintenance of the non-pneumatic tire on the rim. Accordingly, it should be understood, that the non-pneumatic tire grooves provide an interference fit with rim flanges or hook bead ends that operate, in conjunction with the tire inner circumference support ridges or piers to provide an adequate mechanical lock to the preferred rim. Such an adhesive bonding, however, is not required where it is anticipated that the tire will not experience high side loads.

Figure 1:
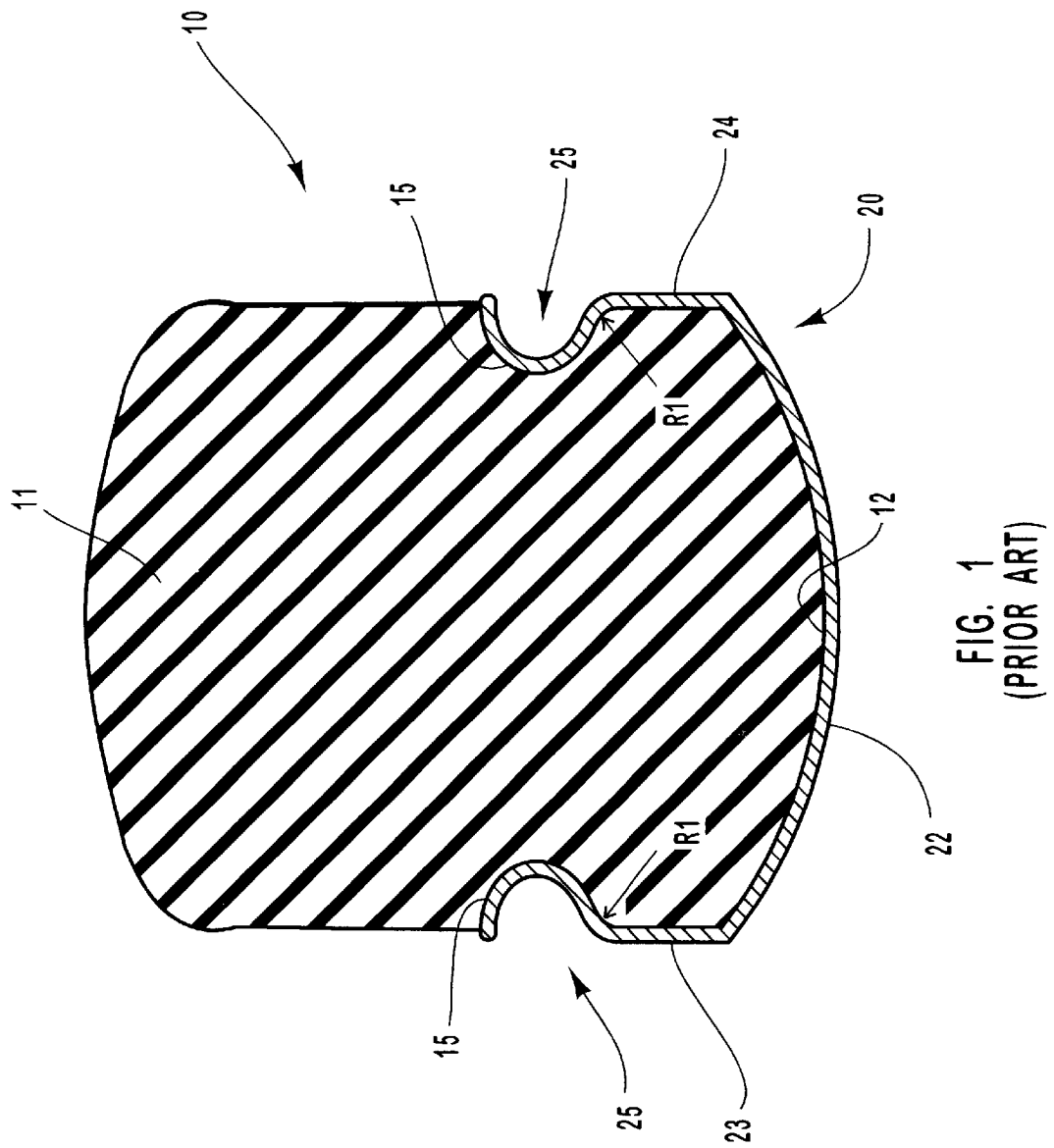
FIG. 1 is a profile view of a rim and tire assembly herein identified as Prior Art.

FIG. 1 shows a cross section of a bicycle tire and wheel assembly 10, identified as Prior Art. More particularly, FIG. 1 shows a crochet-type rim 20 with a solid tire 11 mounted thereto. The tire 11 is formed from solid rubber, urethane, or the like. The tire 11 includes an inner circumference or wheel well engaging surface 12 that is formed across the tire sides walls 14. The tire 11 at its inner circumference 12 is shown seated across and in contact a wheel well or web 22 of rim 20. The rim 20 includes straight sides 23 and 24 that terminate in identical rim flanges 25 that are joined to the lower ends of the rim straight sides , with the flanges each formed with a radius identified as R-1. The individual flanges are each to fit into to maintain an interference fit with grooves or slots 15 formed into the tire 10 sides walls 14, locking the non-pneumatic tire 11 to the rim 20. The non-pneumatic tire of FIG. 1 does not show an inclusion of a bead associated with the grooves or slots 15 though such beads have been included with earlier non-pneumatic tire and rim wheels. Further, where an adhesive bonds is not shown in FIG. 1, it is acknowledges that, as needed, adhesive bonds of non-pneumatic tires to rim arrangements have been employed. Prior to the present invention, however, a non-pneumatic tire has not been supported in a rim structure so as to allow for a partial flow of the tire material into a cavity or space between which tire inner circumference and the rim web or wheel well for providing a cushioning of forces as the tire experiences in use.

Figure 2:
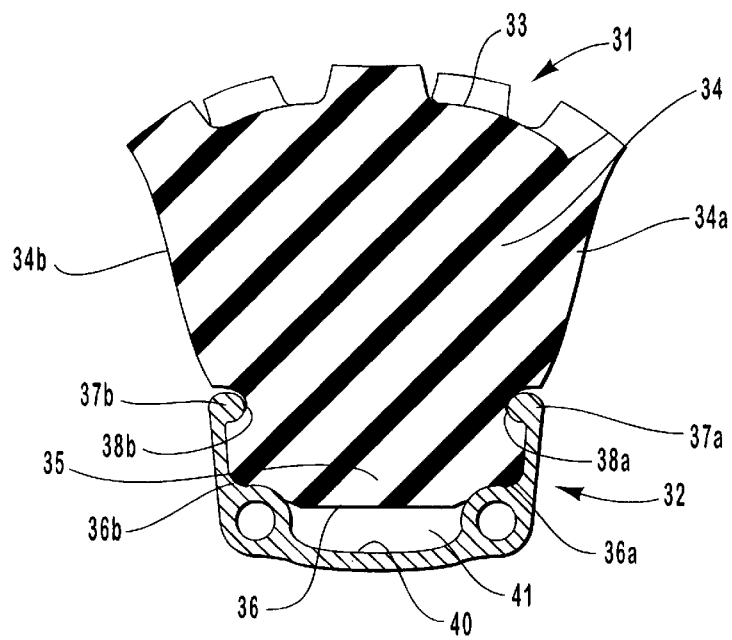
FIG. 2 is a profile view of a non-pneumatic tire and rim of the invention.
Figure 3:
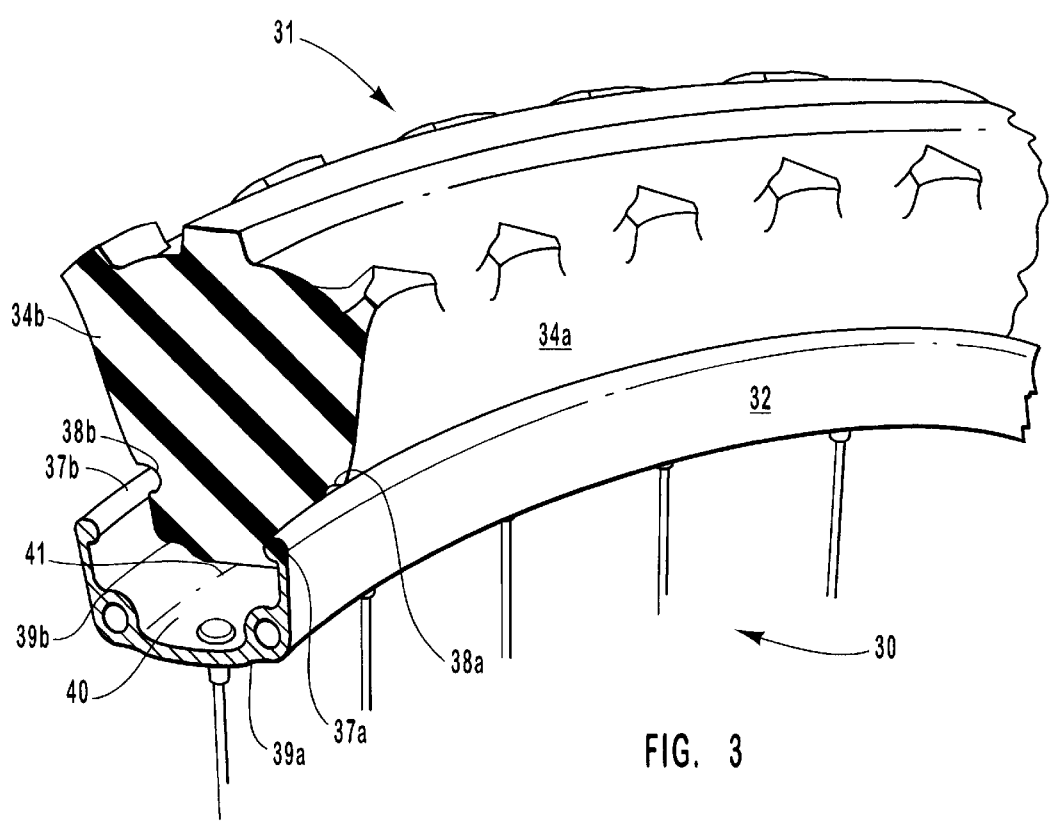
FIG. 3 is a profile perspective section of the non-pneumatic tire and rim of FIG. 2 with spokes shown secured to the rim that extend radially therefrom that are parts of a wheel.

FIGS. 2 and 3, respectively, show a non-pneumatic tire 31 mounted onto a rim 32 as a wheel 30. The non-pneumatic tire 31 is preferably formed from a solid urethane foam, formed in a spin casting process like that as set out in U.S. Pat. No. 4,855,096. Such a non-pneumatic tire is formed to have a dense tread 33, with a less dense internal body or mid-portion 34 and is still least dense at a lower area 35 that terminated in the tire inner circumference 36. While a urethane foam is the preferred material for forming the non-pneumatic tire 31 of the invention to provide a tire having the desired wear, performance and manufacturing characteristics, it should be understood that another elastomeric or urethane material may be used that has like or appropriate wear, provides ease of handling and reliability in use, within the scope of this disclosure. Further, within the scope of this disclosure, the non-pneumatic tire 31 can have essentially a rectangular shape with parallel side walls, or can even be formed with inwardly sloping side walls. The preferred non-pneumatic tire 31 is shown as having a torodial profile that is similar to that of a typical pneumatic tire, and includes a slightly outwardly bowed inner circumference 36. Curved or radiused shallow support grooves 36a and 36b are formed around the opposite sides of the tire inner circumference 36 wherefrom essentially straight outwardly sloping side walls 34a and 34b extend upwardly that connect, at the side walls top ends, to a curved top or tread surface 33 wherein is formed a tire tread pattern. So arranged, the non-pneumatic tire 31 will compress inwardly towards the rim 32 when subjected to a compressive force such as when the wheel 30 rolls over an obstruction like a rock or hole. The invention provides for dampening such compressive forces by a suspension mounting of the non-pneumatic tire 31 in the rim 32, providing a tire and rim that, when they are arranged as a wheel, will exhibit the ride characteristics of a pneumatic tire, as set out hereinbelow.

The non-pneumatic tire 31, that is preferably a solid urethane foam tire, is shown in FIG. 2 mounted to rim 32 by a fitting of a tire inner circumference support groove 36a or 36b across one U-shaped rim inwardly projecting hook bead end 37a or 37b and camming the tire lower portion 35 into the rim 32 interior. In which tire 31 mounting, tire side wall grooves 38a and 38b each receive a rim hook bead end 37a or 37b, providing an interference fit of the non-pneumatic tire 31 onto the rim 32, as shown in FIGS. 2 and 3. So positioned, the non-pneumatic tire 31 lower portion 35 inner circumference sides support grooves 36a and 36b rest upon and are radiused to the outer surface of side ridges or piers 39a and 39b to fit snugly thereon, leaving a mid-portion of the tire inner circumference 36 unsupported above a rim wheel well 40, with an open area 41 therebetween. So arranged, the tire 31 is supported to the rim 32 by the interference fit of tire grooves 38a and 38b to the rim hook bead ends 37a and 37b. Which interference fit, for most applications is sufficiently tight to allow proper flexure of the tire side wall grooves 38a and 38b across the rim hook bead ends 37a and 37b. Which tire side wall grooves 38a and 38b and hook bead ends 37a and 37b have, preferably, a spacing of approximately one (1.0) per cent difference, or spacing distance, between the outer surfaces of the rim hook bead ends 37a and 37b and the tire side wall grooves 38a and 38b, respectively. So arranged, a tight fit of the non-pneumatic tire 31 on rim 32 is provided that will still allow for the tire being mounted onto the rim. Further, as required to maintaining the tire on the rim during use, an adhesive may, but is not required to, be applied between the installed tire grooves 38a and 38b surfaces and the rim hook bend ends 37a and 37b surfaces, within the scope of this disclosure.

Figure 4A:
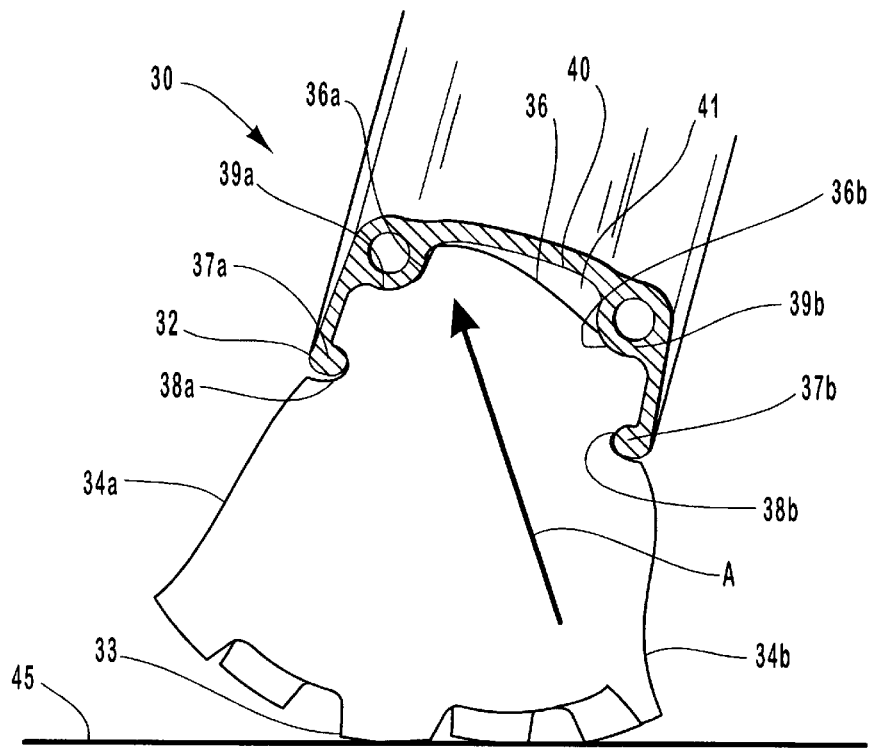
FIG. 4A is a profile view of the non-pneumatic tire and rim of FIGS. 2 and 3 as a wheel that is shown tilted to the right as the non-pneumatic tire would experience when the wheel makes a left turn, showing the tire material as having flowed, shown by arrow A, into the left side of the cavity or open area between the tire inner circumference and rim web, showing the left tire side wall, as having bowed slightly with the right side of the tire tread shown somewhat flattened, providing cushioning.
Figure 4B:
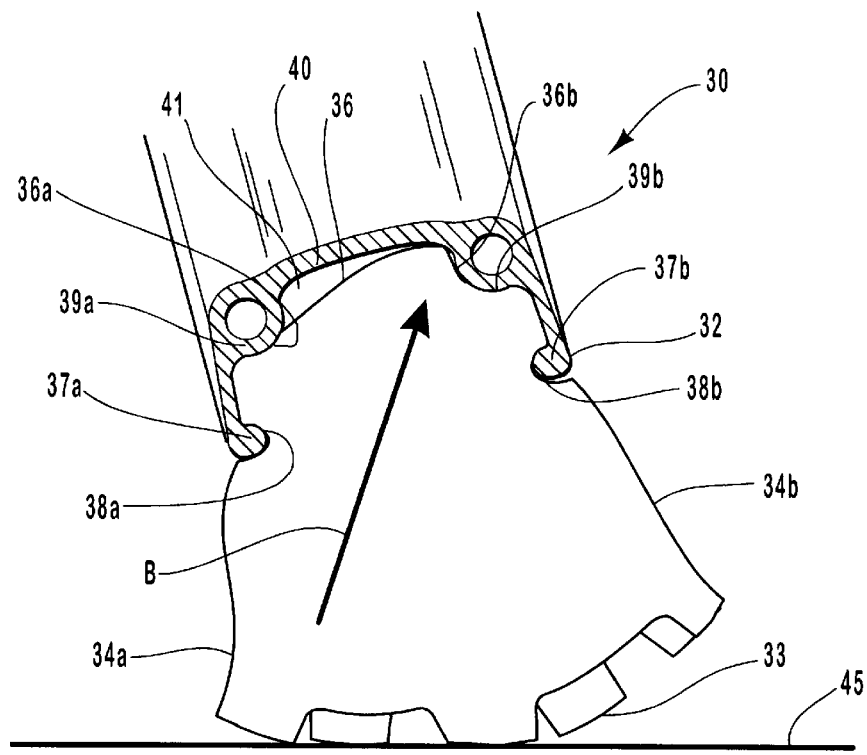
FIG. 4B is a profile view like that of FIG. 4A only showing the tire and rim as a wheel as having been tilted to the left, with arrow B indicating the direction of tire material flow into the cavity.

With the non-pneumatic tire 31 supported in rim 32 arranged as a wheel 30, as shown in FIGS. 3, 4A and 4B, the tire side wall grooves 38a and 38b maintain the rim hook bead ends 37a and 37b, with the tire inner circumference 35 side support grooves 36a and 36b positioned on the rim piers 39a and 39b. The tire is thereby held securely onto the rim during use with the side walls 34a and 34b held against an outward extension or extrusion of one tire side wall when the rolling wheel is tilted from the vertical towards the other tire side, as in a turn, as shown in FIGS. 4A and 4B.

Where wheel 30 is used as a bicycle wheel traveling over rough roads and/or unimproved areas, shown as surface 45, or when making turns on surface 45, as illustrated in FIGS. 4A and 4B, compressive forces are directed into the non-pneumatic tire from striking an object, such as a rock, rolling into a hole, or the like, or in negotiating turns, as shown by arrows A and B in FIGS. 4A and 4B. Such forces will cause an inward displacement or flow of the tire material into the open area or cavity 41 between the tire inner circumference 36 and rim web or wheel well 40. That force, shown as arrows A or B in FIGS. 4A and 4B, or a force that is the result of the wheel striking an object or hitting a hole, causes the tire material to be displaced into the open area 41 away from the force, arrow A or B, with the tire side wall 34a or 34b on the side of the tire the turn is towards shown bowing inwardly. Which tire material inward travel into the open area 41 and bowing action of the tire side wall, as shown in FIGS. 4A and 4B, provides a ride that essentially duplicates that of a pneumatic tire that is subjected to like or the same conditions and actions. Additionally, while not shown, it should be understood that the non-pneumatic tire could be formed to include an enclosed cavity for further increasing compression from the tread 33 into the tire body, providing further ride cushioning, within the scope of this disclosure.

A preferred embodiment has been described above. It will, however, be apparent to one knowledgeable or skilled in the art that the above described embodiment of a non-pneumatic tire and rim combination may incorporate changes and modifications without departing from the general scope of this invention. Which invention therefore is intended to include all such modifications and alterations in so far as they come within the scope of the appended claims and/or a reasonable equivalence thereof.

I claim:

1. A tire and wheel assembly that includes a non-pneumatic tire and rim comprising a non-pneumatic tire formed from a foam elastomeric or urethane material to have a dense outer tread and be increasingly porous to its inner circumference, that has identical continuous mounting grooves formed in tire side walls, adjacent to said inner circumference, and said non-pneumatic tire further includes support grooves formed in opposite sides of said tire inner circumference that are shallow and are radiused, and a continuous rim that is formed from a metal or resinous material and has a U-shape with a flat continuous well or open area formed between upright sides, and which said rim sides each terminate in identical inwardly directed hook bead ends that are formed to fit in said tire side wall mounting grooves, providing an interference fit, and said rim further includes identical inwardly extending ridges or piers formed at opposite sides of said well or open area junctions with said rim sides, which said ridges or piers are shaped to receive said tire support grooves such that said tire support grooves fit snugly on said rim ridges or piers, supporting said non-pneumatic tire, with a space between said rim well or open area and tire inner circumference that is the distance between said rim rides or piers.

2. The tire and well assembly as recited in claim 1, wherein the tire is formed to have a torodial profile and the side wall mounting grooves are formed to provide approximately a one (1.0) percent interference fit difference between said individual groove hook bead end surfaces.

3. The tire and wheel assembly as recited in claim 1, further including an adhesive applied between the surfaces of the tire side wall mounting grooves and the rim hook bead ends, providing an adhesive bonding.

4. The tire and wheel assembly as recited in claim 1, further including an adhesive applied between the surfaces of the tire inner circumference side support grooves and the rim ridges or piers.

* * * * *